(12) United States Patent
Liu

(10) Patent No.: US 6,787,089 B2
(45) Date of Patent: Sep. 7, 2004

(54) METHOD FOR MAKING A SHOE

(76) Inventor: Kun-Chung Liu, No. 5, Alley 9, Lane 212, San-Feng Rd., Hou-Li Hsiang, Taichung Hsien (TW)

( * ) Notice: Subject to any disclaimer, the term of this patent is extended or adjusted under 35 U.S.C. 154(b) by 337 days.

(21) Appl. No.: 10/136,339

(22) Filed: May 2, 2002

(65) Prior Publication Data
US 2003/0204920 A1 Nov. 6, 2003

(51) Int. Cl.$^7$ .......................... B29D 31/50; B29B 5/00; A43D 25/00; A43D 29/00
(52) U.S. Cl. ..................... 264/244; 264/250; 12/142 R; 12/148
(58) Field of Search ................................ 264/244, 250; 12/142 R, 148, 145

(56) References Cited

U.S. PATENT DOCUMENTS 3,983,204 A  *  9/1976  Opinsky et al. ............ 264/244
4,245,406 A  *  1/1981  Landay et al. ................. 36/14

* cited by examiner

Primary Examiner—Stephen J. Lechert, Jr.
(74) Attorney, Agent, or Firm—Lowe Hauptman Gilman & Berner, LLP

(57) ABSTRACT

A method for making a shoe includes the steps of forming a midsole in an outsole in a first mold, transferring the assembly of the midsole and the outsole into a second mold, and forming an insole between the midsole and an upper in the second mold.

4 Claims, 6 Drawing Sheets

METHOD FOR MAKING A SHOE

BACKGROUND OF THE INVENTION

1. Field of the Invention

This invention relates to a method for making a shoe, more particularly to a method for making a shoe having a midsole formed in a recess in an outsole and an insole that encloses the midsole.

2. Description of the Related Art

FIG. 1 illustrates a conventional method for forming a midsole between an upper and an outsole of a shoe in a mold 4. Formation of the shoe is performed on a rotary type injection molding machine (not shown) which includes an injection device and a rotatable disc with a plurality of identical molds thereon for mass production. In operation, the disc continuously rotates in such a manner that each mold is injected with a molding material via the injection device when the mold is turned to an injecting position of the injection device, and is continuously turned along with the disc to permit the injected molding material to undergo curing and cooling processes. The thus formed shoe is then removed from the mold when the latter runs through a cycle.

The aforesaid method is disadvantageous in that since a bottom 101 of the outsole 1 is patterned and is relatively thin, an inner wall 403 of a bottom mold part 401 of the mold 4 is required to have a pattern which conforms to that of the bottom 101 of the outsole 1 so as to prevent undesired deformation of the outsole 1 during the molding process, and since the bottom mold part 401 is a part of the mold 4, which requires a high precision to match with other mold parts of the mold 4, the manufacturing cost thereof is costly. As such, it is relatively costly to prepare different molds for making different shoes that differ in the pattern of the outsole. Moreover, since a portion of the midsole 5 is exposed to the atmosphere, when a filler, such as plastic waste in the form of pellets, is to be added in the midsole 5, some of the pellets may protrude outwardly from said portion of the midsole 5, thereby adversely affecting the appearance of the shoe. When a foamable material is used as the molding material, the curing time is longer as the dimension of the midsole 5 is larger, which increases the aforesaid cycle of the mold on the machine and slows down the production rate of the shoe. Since the machine is relatively expansive, higher costs are incurred when the production rate is slow. Furthermore, the midsole 5 is required to have a high density and a closed cell structure for preventing penetration of water from an outer surface of the exposed portion of the midsole 5.

SUMMARY OF THE INVENTION

Therefore, the object of the present invention is to provide a method for making a shoe that is capable of overcoming the aforementioned drawbacks.

According to the present invention, a method for making a shoe comprises the steps of: preparing an outsole having a bottom wall and a peripheral side wall extending from the bottom wall in a transverse direction relative to the bottom wall and cooperating with the bottom wall to confine a recess therebetween; placing the outsole in a first mold; filling and molding a first molding material in the recess in the outsole in the first mold so as to form a midsole in the recess; preparing an upper having a bottom; preparing a second mold that has an upper mold part with a last, a bottom mold part opposite to the last, and a side mold part that cooperates with the last and the bottom mold part to confine a mold cavity thereamong; placing an assembly of the midsole, the outsole, and the upper in the mold cavity such that the bottom wall of the outsole is pressed against an inner wall of the bottom mold part, that the upper is fittingly sleeved on the last, and that the upper, the outsole, and the midsole cooperately confine an inner cavity thereamong; and filling and molding a second molding material in the inner cavity so as to form an insole that is bonded to the bottom of the upper, the peripheral side wall of the outsole, and the midsole.

BRIEF DESCRIPTION OF THE DRAWINGS

In the drawings which illustrate an embodiment of the invention.

DETAILED DESCRIPTION OF THE PREFERRED EMBODIMENT

Figure 1:
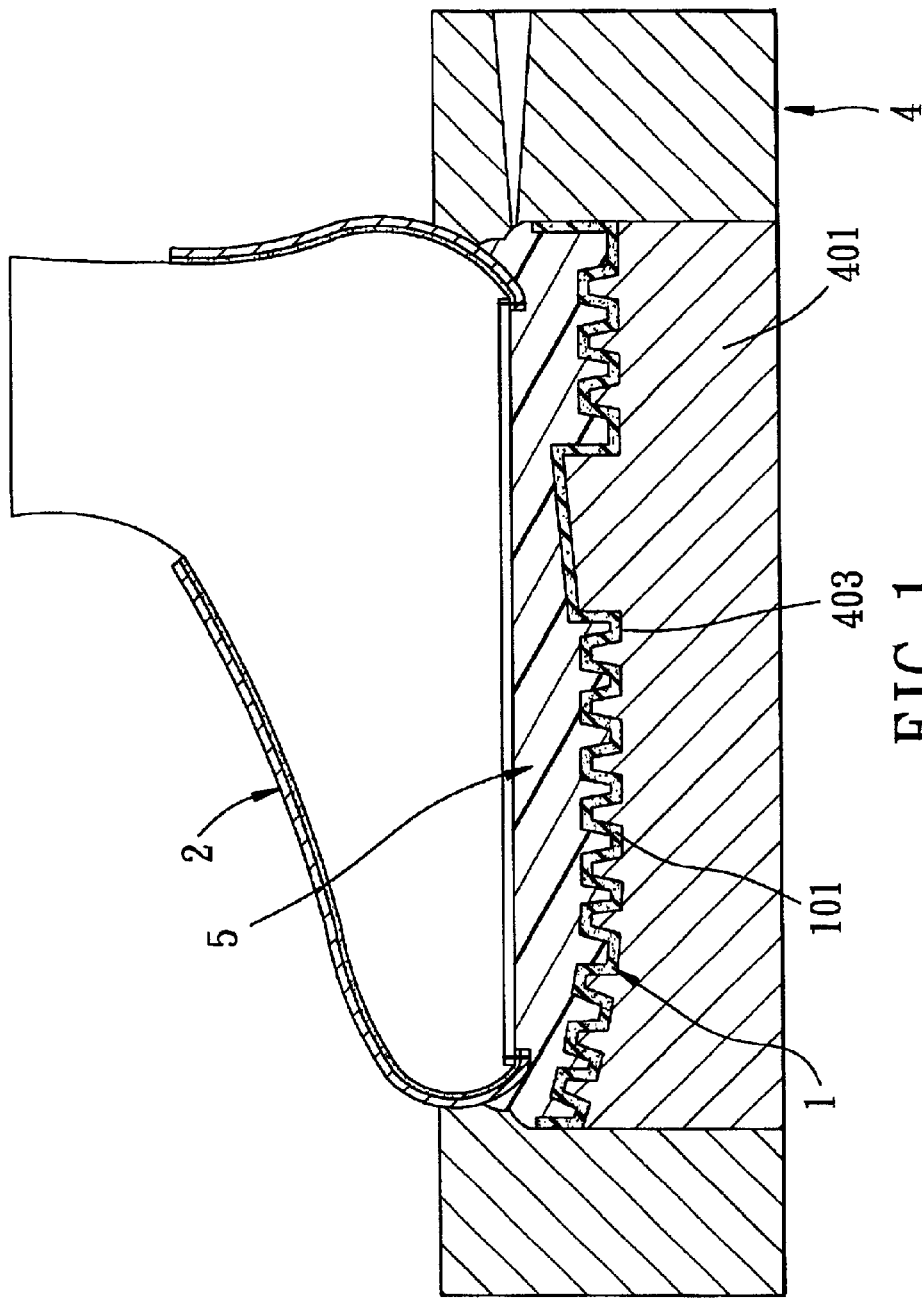
FIG. 1 is a cross-sectional side view to illustrate a conventional method for making a shoe.
Figure 2:
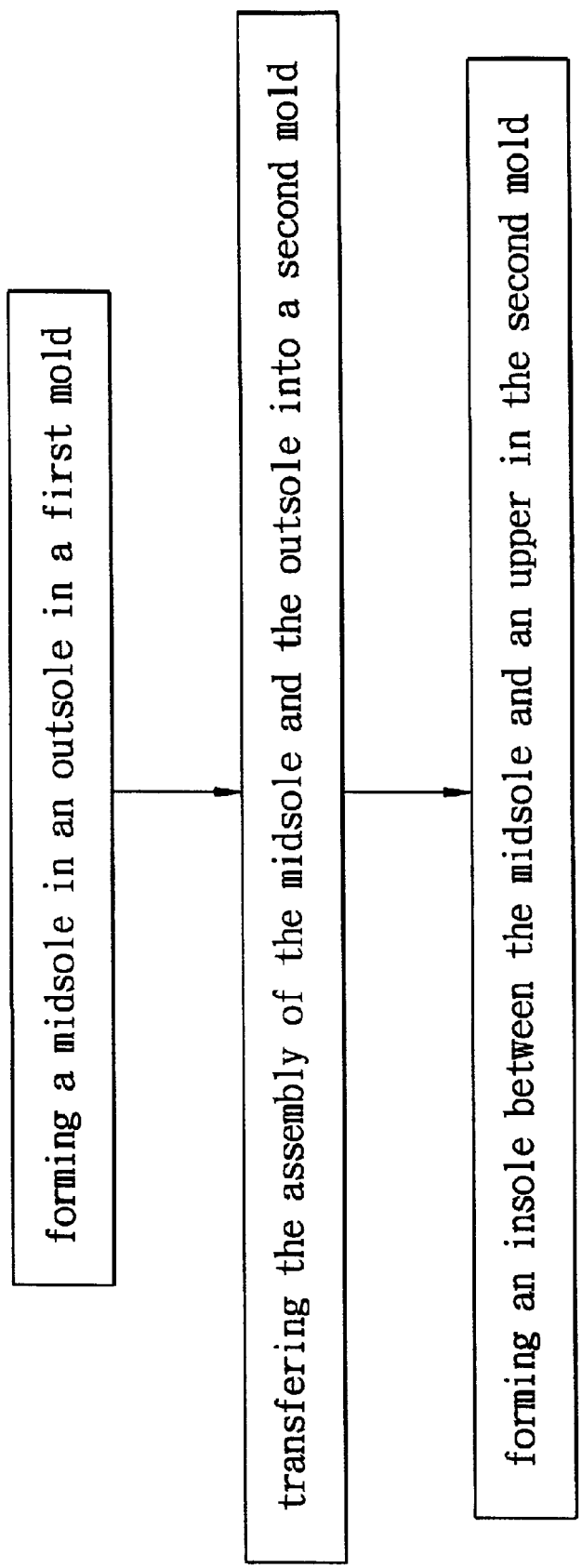
FIG. 2 is a block diagram illustrating consecutive steps of a method embodying this invention for making a shoe.
Figure 3:
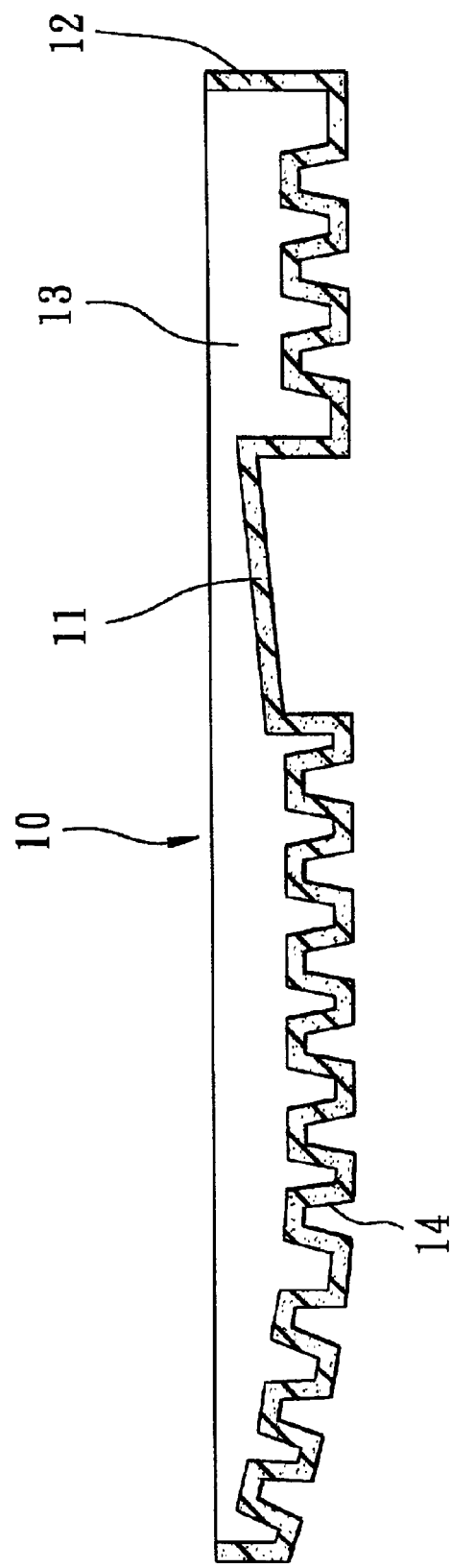
FIG. 3 is a sectional view of an outsole prepared by the method of this invention.
Figure 4:
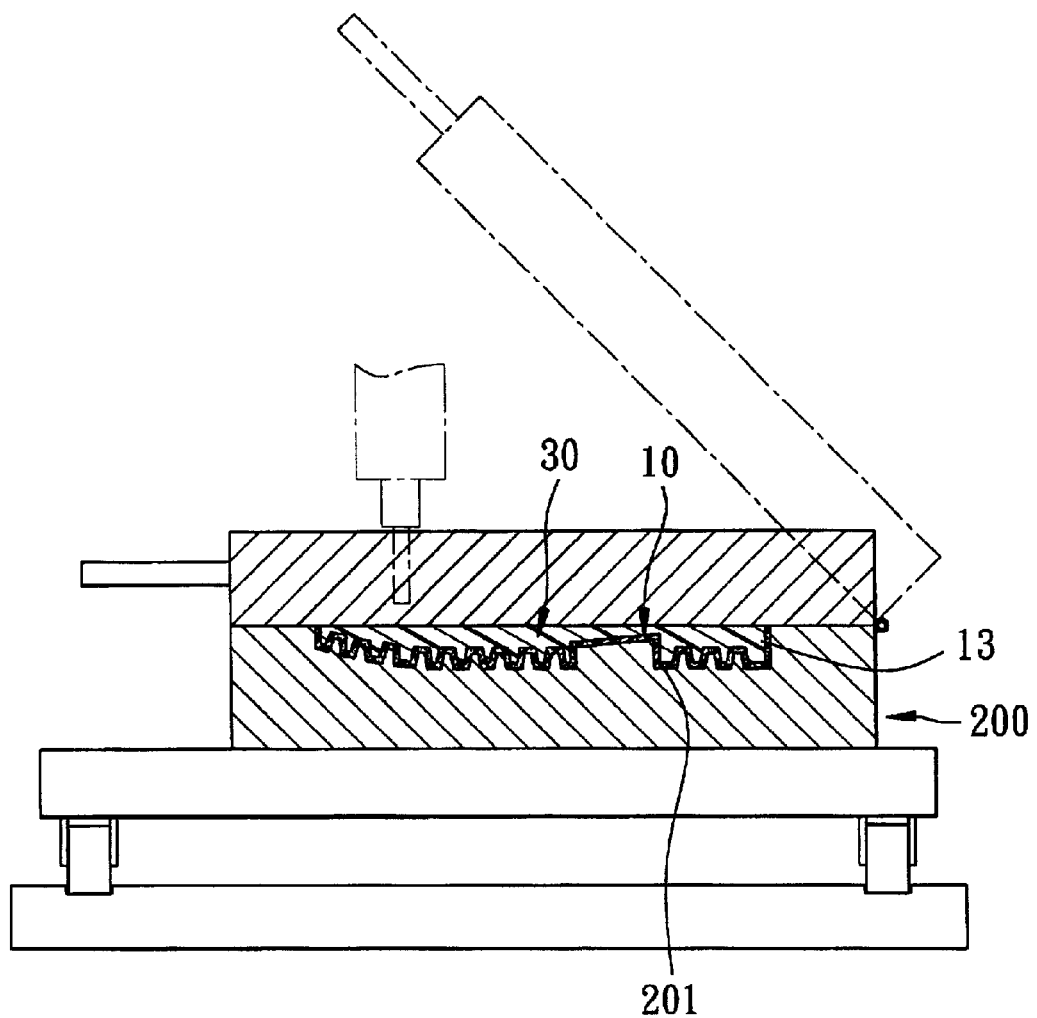
FIG. 4 is a sectional view to illustrate how a midsole is formed in the outsole according to the method of this invention.
Figure 5:
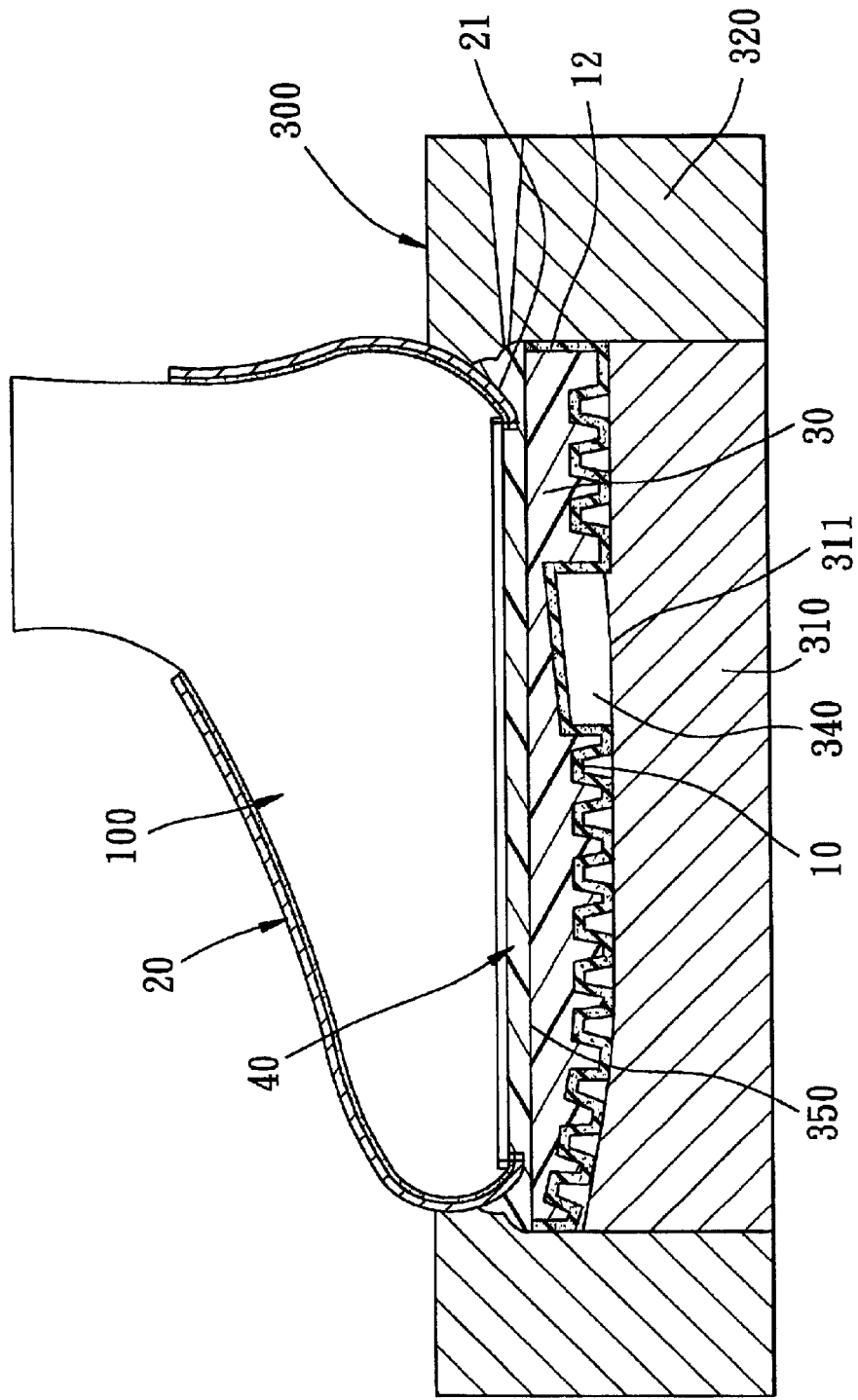
FIG. 5 is a sectional view to illustrate how an insole is formed on the midsole according to the method of this invention.

FIGS. 2 to 5 show consecutive steps of a method embodying this invention for making a shoe by using the aforesaid rotary type injection molding machine (not shown).

The method includes the steps of: preparing an outsole 10 having a bottom wall 11 and a peripheral side wall 12 extending from the bottom wall 11 in a transverse direction relative to the bottom wall 11 and cooperating with the bottom wall 11 to confine a recess 13 therebetween, the bottom wall 11 being patterned with a plurality of grooves 14; placing the outsole 10 in a first mold 200; filling and molding a first molding material in the recess 13 in the outsole 10 in the first mold 200 so as to form a midsole 30 in the recess 13; preparing an upper 20 having a bottom 21; preparing a second mold 300 that has an upper mold part with a last 100, a bottom mold part 310 opposite to the last 100, and a side mold part 320 that cooperates with the last 100 and the bottom mold part 310 to confine a mold cavity 340 thereamong, the second mold 300 being mounted on the rotary type injection machine; placing an assembly of the midsole 30, the outsole 10, and the upper 20 in the mold cavity 340 such that the bottom wall 11 of the outsole 10 is pressed against an inner wall 311 of the bottom mold part 310, that the upper 20 is fittingly sleeved on the last 100, and that the upper 20, the outsole 10, and the midsole 30 cooperately confine an inner cavity 350 thereamong; and filling and molding a second molding material in the inner cavity 350 so as to form an insole 40 that is bonded to the bottom 21 of the upper 20, the peripheral side wall 12 of the outsole 10, and the midsole 30.

The first mold 200 has an inner wall portion 201 that conforms to the bottom wall 11 of the outsole 10 so as to prevent deformation of the outsole 10 during the molding process. It is noted that since the assembly of the midsole 30 and the outsole 10 posesses sufficient structural strength to prevent deformation thereof during the formation of the insole 40, the inner wall 311 of the bottom mold part 310 does not need to conform to the bottom wall 11 of the outsole 10. As such, the manufacturing cost of the second mold 300 can be reduced by virtue of the simple structure of the bottom mold part 310, and the second mold 300 can be used for making shoes that differ in the pattern of the bottom wall of the outsole. The configuration of the first mold 200 is simpler, and precision requirement for the dimensions of the first mold 200 is lower as compared to that of the mold used in the prior art, thereby reducing the manufacturing cost of the first mold 200. Since the dimensions of the insole 40 are smaller than those of the midsole of the prior art, the curing time for the insole 40 is shorter than that of the prior art, which results in a reduction in the cycle time of the second mold 300 on the rotary type injection machine, thereby increasing the production rate of the rotary type injection machine.

Filler (not shown), such as plastic waste in the form of pellets, can be placed in the recess 13 in the outsole 10 before injection of the first molding material into the recess 13 for enhancing the strength of the midsole 30. Since the midsole 30 is confined in the recess 13 and is covered by the insole 40, the drawback as encountered in the prior art with respect to the pellets of the filler being exposed to the atmosphere can be eliminated.

The midsole 30 can be formed from a molding material with a lower density than that of the insole 40 without the drawback as encountered in the prior art with respect to the penetration of water into the midsole, thereby reducing the material cost for producing the midsole 30 and the insole 40.

Figure 6:
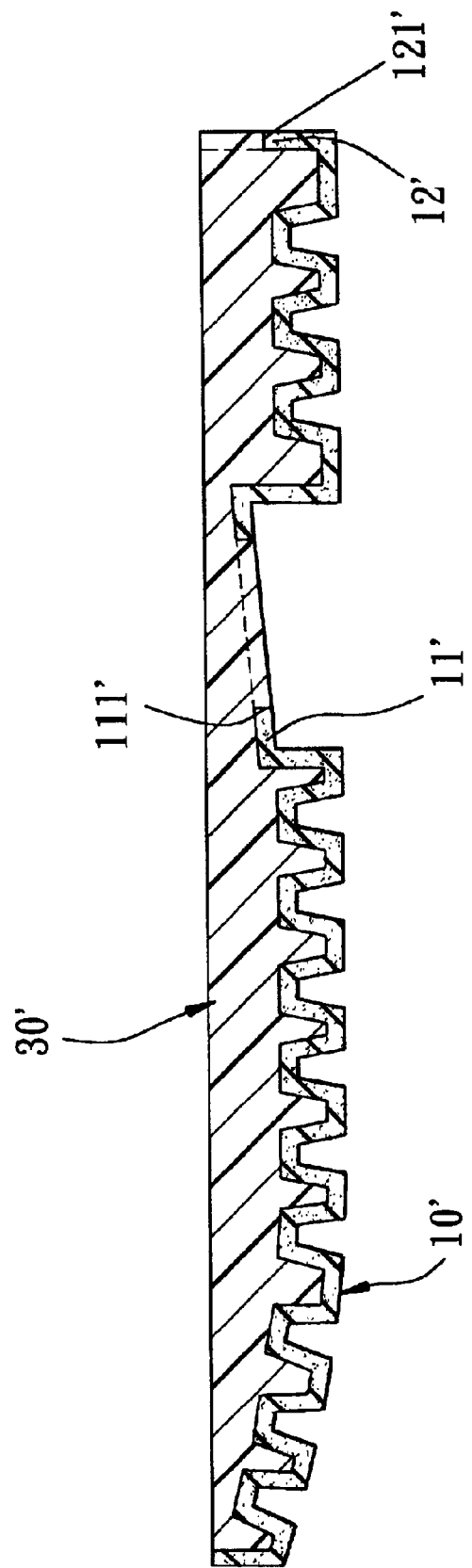
FIG. 6 is a sectional side view of an assembly of the midsole and the outsole with two openings being formed in the outsole.

FIG. 6 illustrates an outsole 10' modified from the previous outsole 10 and formed with a first opening 111' in the bottom wall 11' thereof and a second opening 121' in the peripheral side wall 12' thereof. The thus formed midsole 30' extends into the first and second openings 111', 121'.

With the invention thus explained, it is apparent that various modifications and variations can be made without departing from the spirit of the present invention. It is therefore intended that the invention be limited only as recited in the appended claims.

I claim:

1. A method for making a shoe, comprising the steps of:

preparing an outsole having a bottom wall and a peripheral side wall extending from said bottom wall in a transverse direction relative to said bottom wall and cooperating with said bottom wall to confine a recess therebetween;

placing said outsole in a first mold;

filling and molding a first molding material in said recess in said outsole in said first mold so as to form a midsole in said recess;

preparing an upper having a bottom;

preparing a second mold that has an upper mold part with a last, a bottom mold part opposite to said last, and a side mold part that cooperates with said last and said bottom mold part to confine a mold cavity thereamong;

placing an assembly of said midsole, said outsole, and said upper in said mold cavity such that said bottom wall of said outsole is pressed against an inner wall of said bottom mold part, that said upper is fittingly sleeved on said last, and that said upper, said outsole, and said midsole cooperately confine an inner cavity thereamong; and filling and molding a second molding material in said inner cavity so as to form an insole that is bonded to said bottom of said upper, said peripheral side wall of said outsole, and said midsole.

2. The method of claim 1, wherein said bottom wall of said outsole is patterned, said first mold has an inner wall portion that conforms to said bottom wall of said outsole, and said inner wall of said bottom mold part does not conform to said bottom wall of said outsole.

3. The method of claim 1, further comprising the step of filling a filler in said recess in said outsole before filling said first molding material into said recess.

4. The method of claim 1, wherein said first molding material has a density less than that of said second molding material.

* * * * *